(12) United States Patent
Yu

(10) Patent No.: US 7,774,428 B2
(45) Date of Patent: Aug. 10, 2010

(54) AUTOMATIC RESPONSE TIME MEASUREMENT OF LDAP SERVER OPERATIONS

(75) Inventor: Jean X. Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 11/380,532

(22) Filed: Apr. 27, 2006

(65) Prior Publication Data
US 2007/0294388 A1  Dec. 20, 2007

(51) Int. Cl.
G06F 15/16 (2006.01)
(52) U.S. Cl. .................. 709/218; 709/223; 709/224; 717/127; 702/176; 702/187
(58) Field of Classification Search ............... 709/218, 709/223–224; 717/127; 702/176, 187
See application file for complete search history.

(56) References Cited

U.S. PATENT DOCUMENTS

| | | | | |
|---|---|---|---|---|
| 4,593,280 A | * | 6/1986 | Grow | 370/453 |
| 5,206,857 A | * | 4/1993 | Farleigh | 370/452 |
| RE35,001 E | * | 7/1995 | Grow | 370/452 |
| 6,178,449 B1 | * | 1/2001 | Forman et al. | 709/224 |
| 6,269,080 B1 | * | 7/2001 | Kumar | 370/236 |
| 6,381,635 B1 | * | 4/2002 | Hoyer et al. | 709/207 |
| 6,557,036 B1 | * | 4/2003 | Kavacheri et al. | 709/224 |
| 6,985,944 B2 | | 1/2006 | Aggarwal | |
| 2002/0091798 A1 | | 7/2002 | Joshi et al. | |
| 2002/0129137 A1 | * | 9/2002 | Mills et al. | 709/224 |
| 2004/0088405 A1 | * | 5/2004 | Aggarwal | 709/224 |
| 2004/0103193 A1 | * | 5/2004 | Pandya et al. | 709/224 |
| 2004/0158737 A1 | | 8/2004 | Lo et al. | |
| 2006/0168199 A1 | * | 7/2006 | Chagoly et al. | 709/224 |
| 2006/0224725 A1 | * | 10/2006 | Bali et al. | 709/224 |

OTHER PUBLICATIONS

M. Wahl et al. RFC 2251 "Lightweight Directory Access Protocol." [Retreived Online on Dec. 11, 2009] Dec. 1997. [Retreived from the Internet] <URL: http://www.isi.edu/in-notes/rfc2251.txt>.*

(Continued)

Primary Examiner—Rupal D Dharia
Assistant Examiner—James Baron
(74) Attorney, Agent, or Firm—Francis Lammes; Stephen J. Walder, Jr.; Jeffrey S. LaBaw

(57) ABSTRACT

A mechanism is provided for automatic response time measurement of Lightweight Directory Access Protocol (LDAP) server operations are provided. The mechanism makes use of an LDAP server plug-in interface and LDAP server plug-in modules to automatically inject response time measurement code before and after each LDAP server operation during real time operation of the LDAP server in a runtime environment. In addition, the mechanism makes use of correlation tokens in the LDAP environment so that LDAP client and server operations may be correlated with one another in an end-to-end transaction. Mechanisms for passing correlation tokens between plug-in modules for the same LDAP server operation and passing correlation tokens between the LDAP client and LDAP server, and among LDAP client calls within a single session, are also provided.

32 Claims, 4 Drawing Sheets

OTHER PUBLICATIONS

Wheeler, David A. "Shared Libraries" [Retreived Online on Dec. 11, 2008] Aug. 7, 2002. [Retreived from the Internet] <URL: http://web.archive.org/web/20020807003249/http://www.tldp.org/HOWTO/Program-Library-HOWTO/shared-libraries.html>.*

Technical Standard. "Application Response Measurement (ARM)" [Retreived Online on Dec. 11, 2008] © 2004, The Open Group. [Retreived from the Internet] <URL: http://www.opengroup.org/onlinepubs/9699959799/toc.pdf>.*

The Open Group. "Application Response Measurement (ARM), Issue 4.0, Version 2—Java Binding." [Retreived Online on Dec. 11, 2008] © 2004, The Open Group. [Retreived from the Internet] <URL: http://www.opengroup.org/onlinepubs/9699959799/toc.pdf>.*

\* cited by examiner

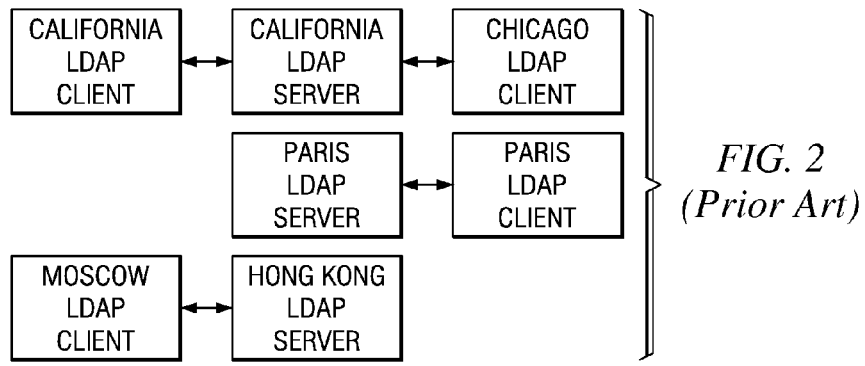
*FIG. 2 (Prior Art)*
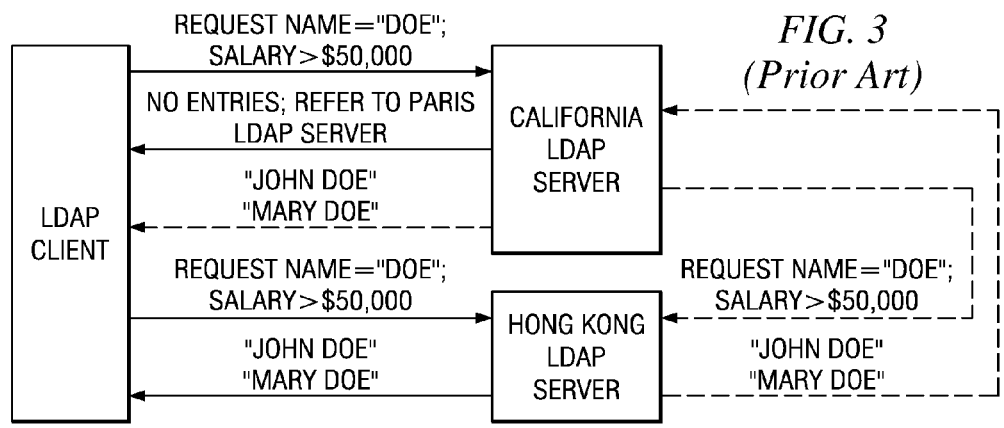
*FIG. 3 (Prior Art)*
*FIG. 5*
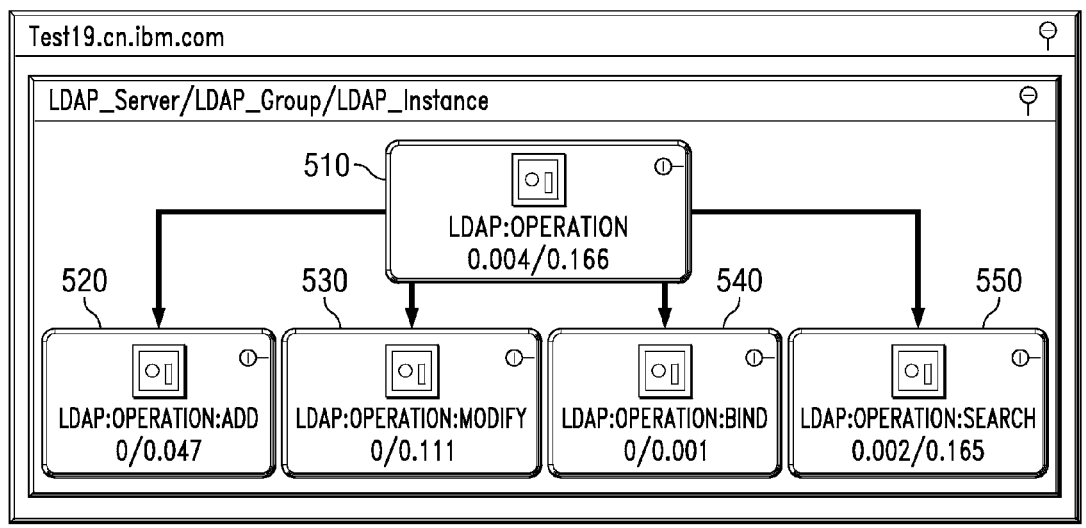

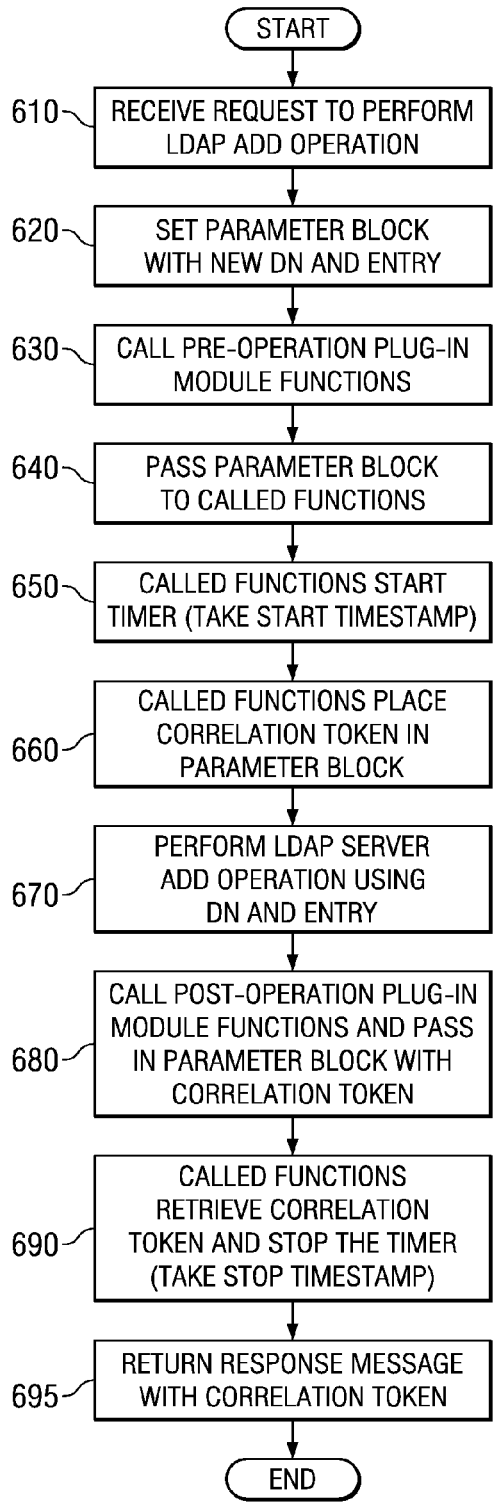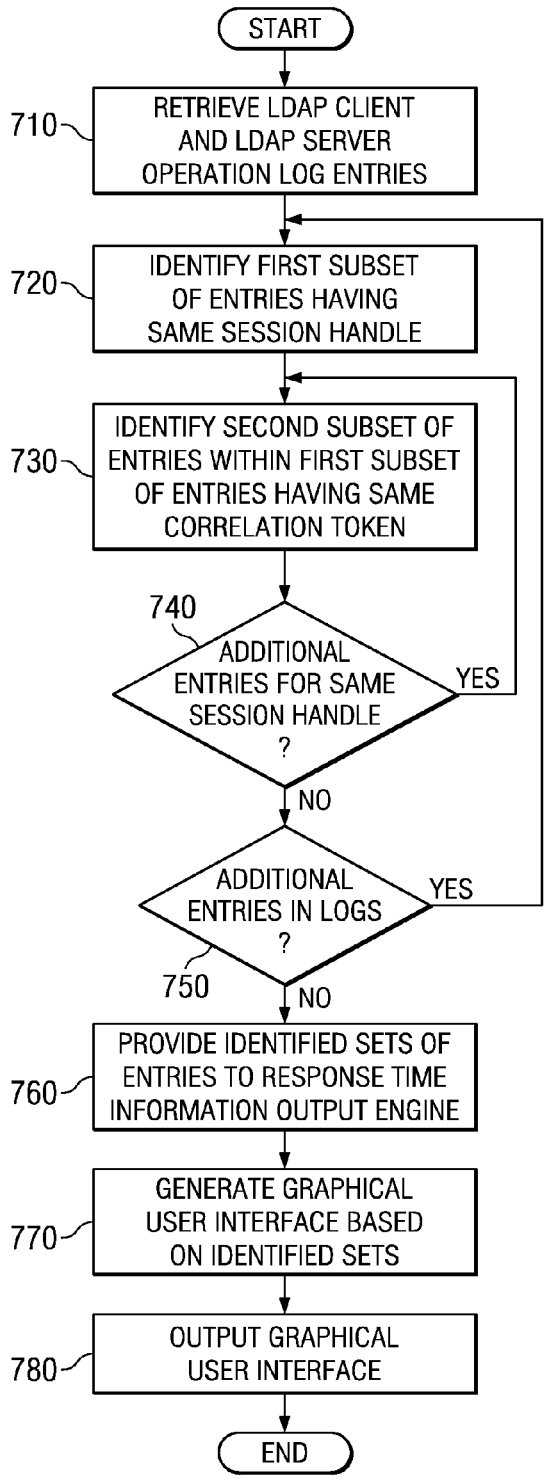

AUTOMATIC RESPONSE TIME MEASUREMENT OF LDAP SERVER OPERATIONS

BACKGROUND

1. Technical Field

The present application relates generally to an improved data processing system and method. More specifically, the present application is directed to an apparatus and method for automatic response time measurement of lightweight directory access protocol (LDAP) server operations.

2. Description of Related Art

A typical large enterprise has different types of systems, many installations of those systems, numerous types of information stored in those systems, and has a need to manage access to the information and to the systems themselves. One way of controlling such access is to make use of the Lightweight Directory Access Protocol (LDAP). LDAP is a widely used networking protocol for querying and modifying directory services running over Transmission Control Protocol/Internet Protocol (TCP/IP). An LDAP directory often reflects various political, geographic, and/or organizational boundaries, depending on the model chosen. LDAP deployments today tend to use Domain Name System (DNS) names for structuring the most simple levels of the hierarchy. Further into the directory hierarchy might appear entries representing people, organizational units, printers, documents, groups of people, or anything else which represents a given tree entry, or multiple entries.

There is much information about LDAP and LDAP directories available via the Internet and other information sources. One source of information on LDAP is the Web-based encyclopedia Wikipedia (www.wikipedia.org) from which much of the following background information was obtained.

LDAP is defined in terms of ASN.1 and protocol messages are encoded in the binary format Basic Encoding Rules (BER). LDAP uses textual representations for a number of ASN.1 fields/types, however. LDAP is used to access LDAP directories which follow the X.500 model comprising a tree of directory entries each consisting of a set of attributes. An attribute has a name (an attribute type or attribute description) and one or more values. The attributes are defined in a schema. Each entry has a unique identifier, i.e. its Distinguished Name (DN), that consists of its Relative Distinguished Name (RDN), constructed from some attribute(s) in the entry, followed by the parent entry's DN. A DN may change over the lifetime of the entry, for instance, when entries are moved within a tree. To reliably and unambiguously identify entries, a Universally Unique Identifier (UUID) is provided in the set of the entry's operational attributes.

An example entry may look like the following when represented in LDAP Directory Interchange Format (LDIF):

dn: cn=John Doe,dc=example,dc=com
cn: John Doe
givenName: John
sn: Doe
telephoneNumber: +1 555 6789
telephoneNumber: +1 555 1234
mail: john@example.com
manager: cn=Barbara Doe,dc=example,dc=com
objectClass: inetOrgPerson
objectClass: organizationalPerson
objectClass: person
objectClass: top where dn is the name of the entry and is not an attribute nor part of the entry, "cn=John Doe" is the entry's RDN, and "dc=example,dc=com" is the DN of the parent entry. The other lines of the above example entry show the attributes in the entry. Attribute names are typically mnemonic strings, such as "cn" for common name, "dc" for domain component, and "mail" for e-mail address.

An LDAP server holds a subtree starting from a specific entry, e.g. "dc=example,dc=com" and its children. LDAP servers may also hold references to other servers, such that an attempt to access "ou=Some department,dc=example,dc=com", for example, could return a referral or continuation reference to another LDAP server which holds that part of the directory tree. The client can then contact the other LDAP server. Alternatively, some LDAP servers also support chaining, which means the LDAP server contacts the other LDAP server and returns the results to the client.

A client, running a browser application, for example, starts an LDAP session by connecting to an LDAP server using a designated communication port, for example, default TCP port 389. The client then sends operation requests to the LDAP server and the LDAP server sends responses in return. With some exceptions, the client need not wait for a response before sending the next request and the LDAP server may then send the responses in any order.

The basic operations used with an LDAP server are, in order:

Bind—authenticate and specify LDAP protocol version,
Start TLS—protect the connection with Transport Layer Security (TLS) to have a more secure connection,
Search—search for and/or retrieve directory entries,
Compare—test if a named entry contains a given attribute value,
Add a new entry,
Delete an entry,
Modify an entry,
Modify DN—move or rename an entry,
Abandon—abort a previous request,
Extended Operation—generic operation used to define other operations, and
Unbind—close the connection, not the inverse of Bind.

The client gives each request a positive Message ID, and the LDAP server response has the same Message ID. The response includes a numeric result code indicating success, some error condition, or some other special cases. Before the response, the LDAP server may send other messages with other result data, e.g., each entry found by the Search operation may be returned in such a message.

The Bind operation authenticates the client to the LDAP server. Simple Bind sends the user's DN and password in cleartext so that the connection may be protected using Transport Layer Security (TLS). The LDAP server typically checks the password against the userPassword attribute in the named entry. Anonymous Bind (with empty DN and password) resets the connection to an anonymous state. Bind also sets the LDAP protocol version.

The Start TLS operation establishes Transport Layer Security (the descendant of Secure Socket Layer (SSL)) on the connection which provides data confidentiality protection and/or data integrity protection. During TLS negotiation, the LDAP server sends its X.509 certificate to prove its identity and the client may do so as well. After proving their identities to one another, the client may then use an appropriate command to have this identity used in determining the identity used in making LDAP authorization decisions.

The Search operation is used to both search for and read entries. the Search operation parameters are:

baseObject—the DN (Distinguished Name) of the entry at which to start the search, scope—baseObject (search just the named entry, typically used to read one entry), singleLevel (entries immediately below the base DN), or wholeSubtree (the entire subtree starting at the base DN).

filter—how to examine each entry in the scope, e.g., (&(objectClass=person) (|(givenName=John) (mail=john*)))—search for persons who either have given name John or an e-mail address starting with john.

derefAliases—whether and how to follow alias entries (entries which refer to other entries), attributes—which attributes to return in result entries.

sizeLimit, timeLimit—max number of entries, and max search time.

typesonly—return attribute types only, not attribute values.

The LDAP server returns the matching entries and may return continuation references (in any order), followed by the final result with the result code.

The Compare operation takes a DN, an attribute name, and an attribute value, and checks if the named entry contains that attribute with that value.

Add, Delete, Modify and Modify DN all require the DN of the entry to change. Modify takes a list of attributes to modify and the modifications to perform on each, e.g., delete the attribute or some values, add new values, or replace the current values with the new ones. Modify DN (move/rename entry) takes a new RDN (Relative Distinguished Name), optionally a new parent's DN, and a flag which indicates whether to delete the value(s) in the entry which match the old RDN.

An update operation, e.g., Add, Delete, Modify, or Modify DN, is atomic, i.e. other operations will see either the new entry or the old one. On the other hand, LDAP does not define transactions of multiple operations. Thus, if a client reads an entry and then modifies it, another client may have updated the entry in the mean time, i.e. before the modification.

The Extended Operation is a generic LDAP operation which can be used to define new operations. Examples include the Cancel, Password Modify, and Start TLS operations.

The Abandon operation requests that the LDAP server abort an operation named by a message ID. The LDAP server need not honor the request, except with search operations in progress. Unfortunately, the Abandon operation does not send a response. A similar Cancel extended operation has therefore been defined which does send responses, but not all implementations support this.

The Unbind operation abandons any outstanding operations and closes the connection. It has no response. Clients can abort a session by simply closing the connection or using the unbind operation.

As mentioned above, the contents of the entries in a subtree are governed by a schema. The schema defines the attribute types that directory entries may contain. An attribute definition includes a syntax. For example, a "mail" attribute might contain the syntax value "user@example.com". A "jpegphoto" attribute may contain photograph(s) in binary JPEG/JFIF format syntax. A "member" attribute may contain the DNs of other directory entries. Attribute definitions also include whether the attribute is single-valued or multi-valued, how to search and/or compare the attribute, e.g., case-sensitive vs. case-insensitive, whether substring matching is supported, and the like.

The schema defines object classes. Each entry must have an objectClass attribute containing named classes defined in the schema. The named classes describe what kind of object an entry represents—e.g. a person, organization, domain, or the like. The named classes also identify which attributes the entry may contain and which attributes the entry must contain. Most schema elements have a name and a globally unique Object identifier (OID). LDAP server administrators may define their own schemas in addition to standard ones.

LDAP servers and LDAP directories, such as that described above, are used in many different types of electronic enterprise systems in today's information centered society. The various implementations of LDAP servers and LDAP directories cannot all be described herein, however FIG. 1, described hereafter, provides one example of an implementation of an LDAP server and LDAP directory. FIGS. 2 and 3 illustrate higher level interactions between client computing devices and an LDAP server.

FIG. 1 is an exemplary diagram illustrating one organization of a secure portal cluster environment in which an LDAP server is utilized. As shown in FIG. 1, the secure portal cluster environment 100 includes a portal server 110, a backend server 120, a policy server 130, and directory server 140. The secure portal cluster environment 100 is accessed by a user via the browser application 150 by way of the reverse proxy server 160. The reverse proxy server 160 includes a Tivoli Access Manager (TAM) WebSeal component 162 which is used to control access to the secure portal cluster environment 100 via a user logon process.

The portal server 110 includes International Technical Support Organization (ITSO) Bank Portlets 112 and WebSphere Portal 114 which provide user portal services for accessing the secure portal cluster environment 100. The backend server 120 includes ITSO Bank Enterprise Java Beans (EJBs) 122 and WebSphere application server 124 for providing the actual applications accessible via the user portal services of the portal server 110. The policy server 130 includes TAM policy server 132 and authorization server 134 which provide the policies and functionality for controlling access to protected resources of the secure portal cluster environment 100. The directory server 140 includes Tivoli Directory Server 142 which is an LDAP server that provides access to information in LDAP directory 144 for controlling access to protected resources. The Tivoli Access Manager and Tivoli Directory Server are available from International Business Machines, Inc. of Armonk, N.Y.

The TAM Webseal 162, portal server 110, and web application server 124 interact with the LDAP user registry via the Tivoli Directory Server 142. In this exemplary environment, the LDAP directory 144 contains user information accessible via the LDAP directory server, e.g., Tivoli Directory Server 142, that is used by the portal and application servers 110 and 124 to control access by users to protected resources.

The above implementation of an LDAP server and LDAP directory may be used, for example, to provide a centralized set of services to Web applications. In addition to a centralized approach, multiple LDAP servers can be utilized to provide services for the same set of services. In such an implementation, LDAP directory clients may be able to access whichever LDAP directory server is most conveniently located with respect to that client. An example of such a multiple LDAP server approach is shown in FIG. 2.

As shown in FIG. 2, LDAP servers for accessing the same set of LDAP directory objects may be distributed in different geographical locations, e.g., California, Paris, and Hong Kong. LDAP clients may access the particular LDAP server that is most conveniently located to that LDAP client. For example, both the California and Chicago based clients may access the California LDAP server, the Paris based LDAP client may access the Paris LDAP server, and the Moscow based LDAP client may access the Hong Kong LDAP server. Each of the servers may access associated LDAP directories that contain the same LDAP objects as each of the other LDAP server associated LDAP directories. That is, each LDAP server is a replica of each of the other LDAP servers.

Another alternative is to use multiple LDAP servers that are able to cooperate with each other to provide a service. In such an implementation, if a particular LDAP server is unable to fulfill a client request, the first LDAP server may refer the client to another LDAP server or be chained to another LDAP server so as to retrieve the necessary information from the other LDAP server. Such an approach is shown in FIG. 3.

As shown in FIG. 3, an LDAP client may send a first request for an individual with the name "Doe" and a salary greater than $50,000.00 to the California based LDAP server. The California based LDAP server may not contain any entries for an individual meeting these search requirements and may inform the LDAP client to direct its request to the Paris based LDAP server. In this implementation, the California and Paris based LDAP servers may be associated with LDAP directories that are not replicas of each other and thus, may contain different information.

In response to the referral to the Paris based LDAP server, the LDAP client may send its request as a second request to the Paris based LDAP server. As a response, the Paris based LDAP server may return the entries for "John Doe" and "Mary Doe" to the LDAP client.

Rather than sending a referral back to the LDAP client, however, in a chaining implementation, the California based LDAP server may automatically contact the Paris based LDAP server for the requested entries and may return them to the LDAP client as if the California based LDAP server had the entries in its own LDAP directory. This alternative is shown in FIG. 3 with dashed lines.

Web applications rely heavily on the LDAP server for user login, access control, personalization, address books, and the like. A large number of customer problems are related to the availability and performance of the LDAP server. Thus, it would be beneficial to have a mechanism for monitoring the availability and performance of LDAP servers, not only by themselves, but in the context of an entire business transaction.

One known solution for monitoring LDAP servers is to use a management application that uses the Simple Network Management Protocol (SNMP) network protocol to monitor the state of network devices. In another solution, a LDAP client application can be used to connect to a LDAP directory server and issue a search request for an entry. If the entry is returned within a reasonable span of time, the LDAP directory may be considered functional. This is known as "pinging" the LDAP directory.

In addition to the above, the operating system performance data may be monitored and/or log files may be analyzed to determine LDAP server performance. Monitoring the operating system can be useful when the LDAP directory server's performance is suffering because of an operating system problem. Analyzing the log files allows a monitoring application to scan the LDAP directory server's log files for messages that indicate an error condition and performance problem.

While these known solutions provide some information that is useful in identifying performance problems with regard to LDAP servers, they suffer from a number of drawbacks. First, none of the known solutions provides real time response time measurement for LDAP operations. Pinging the LDAP server may give an indication of operation response time, however what is being measured is synthetic invocation from a test client, not an actual invocation as it happens in a real time environment. Furthermore, none of the known solutions provides the ability to correlate between LDAP client and server operations. Moreover, none of the known solutions provides correlation among client operations.

SUMMARY

In one illustrative embodiment, a mechanism is provided for measuring a response time of the LDAP server with regard to an LDAP transaction. The illustrative embodiment loads, in the LDAP server, a pre-operation plug-in module having a first function for starting a timer. The illustrative embodiment loads, in the LDAP server, a post-operation plug-in module having a second function for stopping the timer. The illustrative embodiment receives, in the LDAP server, a request for an LDAP operation. The illustrative embodiment calls, by the LDAP server, the first function in the pre-operation plug-in module to start the timer in response to receiving the request for the LDAP operation. The illustrative embodiment stores, by the LDAP server, a correlation token generated by the pre-operation plug-in module and a started timestamp taken by the pre-operation plug-in module in an operation log upon starting the timer. The illustrative embodiment passes, by the LDAP server, the correlation token to the post-operation plug-in module. The illustrative embodiment performs, by the LDAP server, the requested LDAP operation after calling the first function. The illustrative embodiment calls, by the LDAP server, the second function in the post-operation plug-in module to stop the timer in response to completion of the LDAP operation. The illustrative embodiment stores, by the LDAP server, the correlation token and a stopped timestamp taken by the post-operation plug-in module in the operation log upon stopping the timer. The illustrative embodiment measures a response time for the LDAP operation based on a difference between the started timestamp and the stopped timestamp using the correlation token to identify related timestamps in a plurality of timestamps stored in the operation log. In the illustrative embodiment, the pre-operation plug-in module and post-operation plug-in module constitute a pair of plug-in modules. In the illustrative embodiment, a separate pair of plug-in modules is loaded for individual ones of client accessible LDAP operations in a plurality of LDAP operations received from an LDAP client.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for measuring a response time of a LDAP data processing system with regard to an LDAP transaction. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram illustrating a multiple LDAP server environment in which replication of LDAP directories is utilized;

FIG. 3 is an exemplary diagram illustrating a multiple LDAP server environment in which referrals and/or chaining of LDAP servers is utilized;

FIG. 5 is an exemplary diagram illustrating a graphical display of response time that may be generated using the response time measurement mechanisms of an illustrative embodiment;

FIG. 6 is a flowchart outlining an exemplary operation for measuring a response time of an LDAP server ADD operation in accordance with one illustrative embodiment; and FIG. 7 is a flowchart outlining an exemplary operation for obtaining an end-to-end transaction response time information utilizing the mechanisms of one illustrative embodiment.

DETAILED DESCRIPTION OF THE PREFERRED EMBODIMENTS

The illustrative embodiments provide a system and method for response time monitoring of a Lightweight Directory Access Protocol (LDAP) directory server (LDAP server) operations and end-to-end transaction response time correlation. The system and method are preferably implemented in a distributed data processing environment including at least one LDAP server and at least one LDAP client. The at least one LDAP server may be any type of server computing device running LDAP server application instructions. The at least one LDAP client may be any type of client computing device running a browser application or other software instructions through which the client computing device communicates with the LDAP server.

Figure 1:
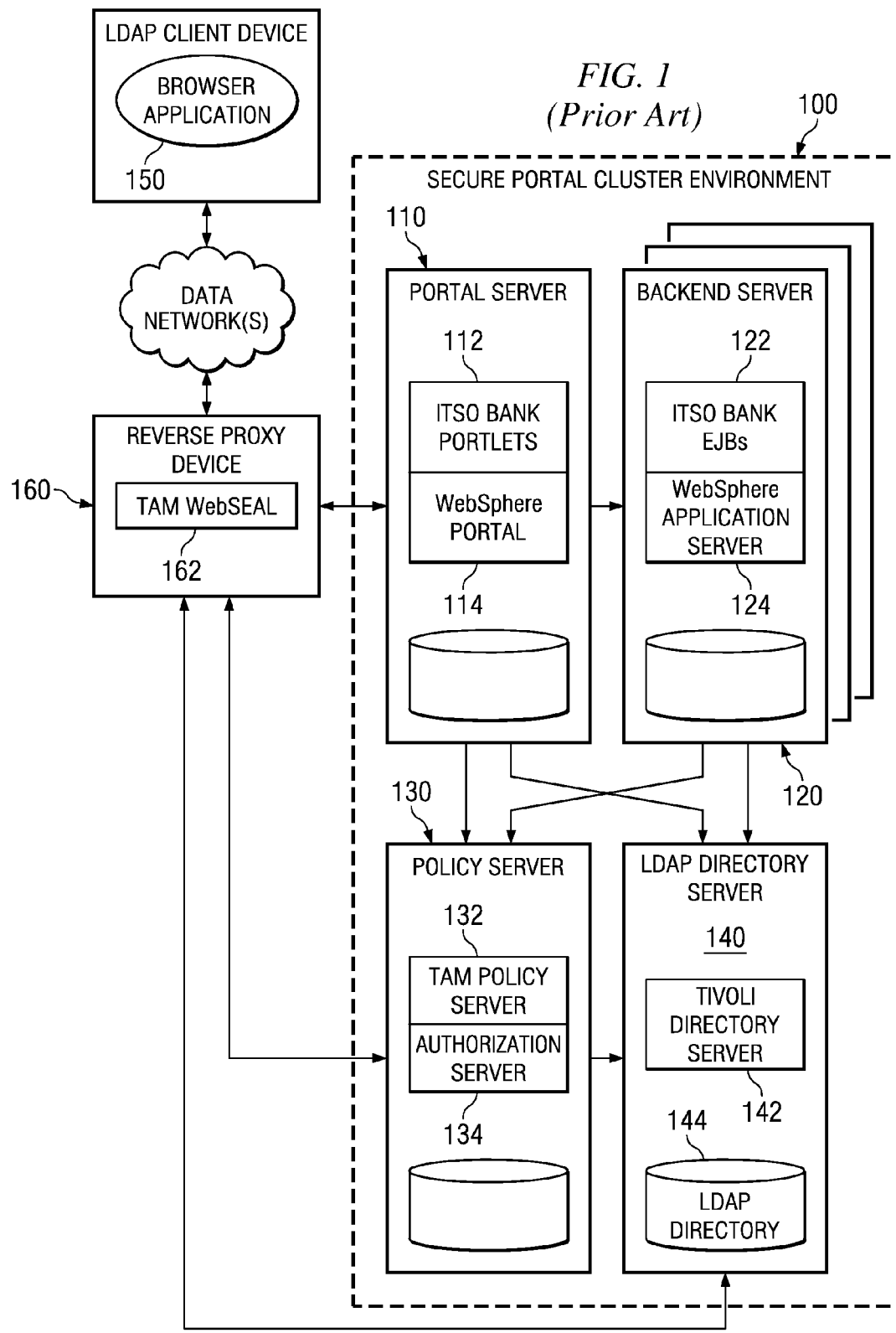
FIG. 1 is an exemplary diagram illustrating one organization of a secure portal cluster environment in which an LDAP server is utilized.
Figure 4:
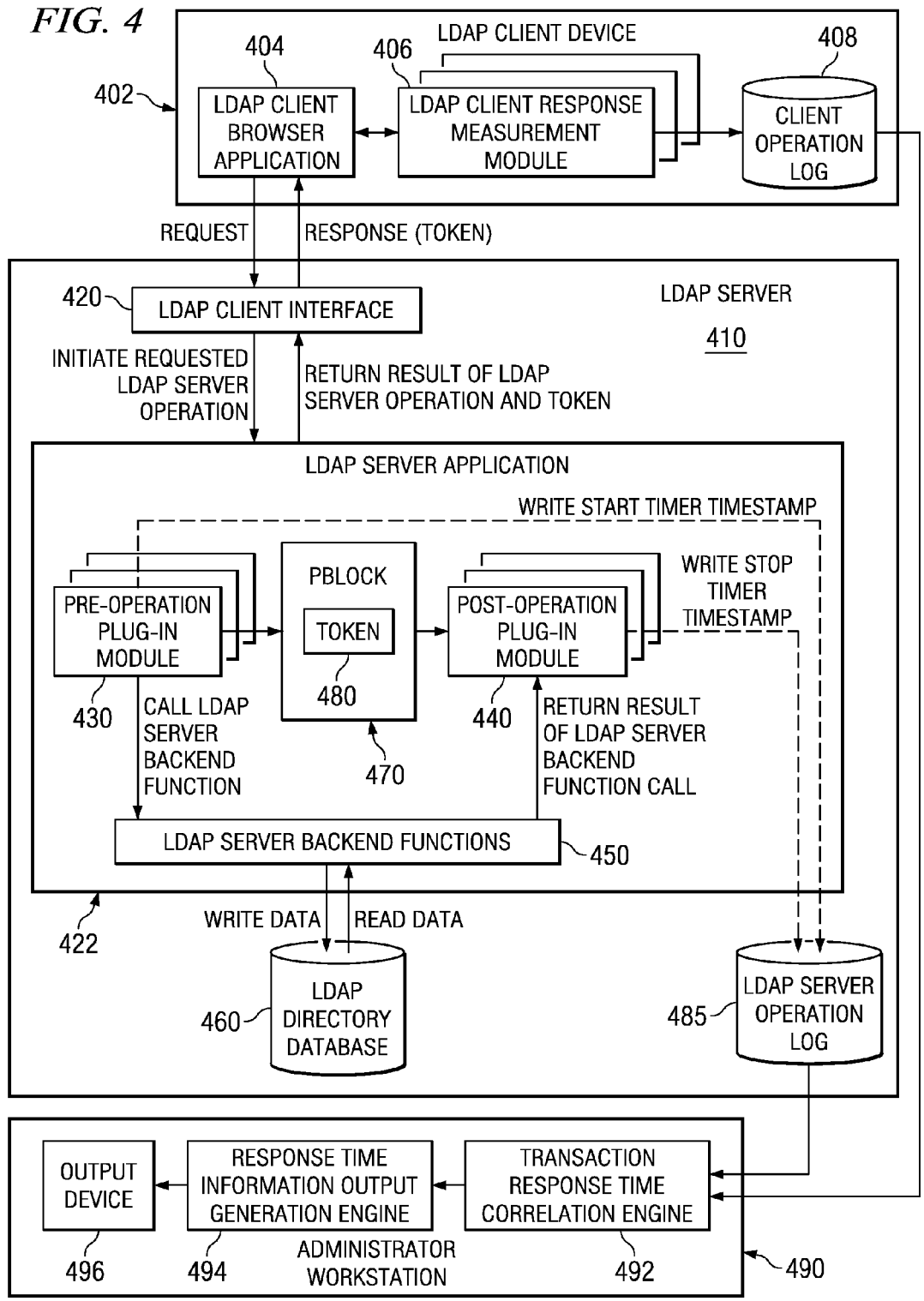
FIG. 4 is an exemplary block diagram illustrating an interaction between an LDAP client and a LDAP server in accordance with one illustrative embodiment.

FIG. 4 is an exemplary block diagram illustrating an interaction between such an LDAP client and a LDAP server in accordance with one illustrative embodiment. As shown in FIG. 4, the LDAP client device 402 includes LDAP client browser application 404 and LDAP client response measurement module 406. The LDAP client response measurement module 406 monitors response times for LDAP client operations initiated by the LDAP client browser application 404. Response time information is stored in entries of the client operation log data structure 408 for later use in correlating these response times with LDAP server operation log entries, as described hereafter.

The LDAP client device 402 may register with the LDAP server 410 via an initialization operation, such as by calling the ldap_init( ) method which returns a session handle that is a pointer to an opaque session data structure that is passed to subsequent calls that pertain to the session. This opaque session data structure may be accessed and modified using application program interfaces (APIs) that allow applications to set a variety of session-wide parameters. Examples of these APIs include the ldap_get_option( ) and ldap_set_option( ) APIs.

After registering with the LDAP server 410, the LDAP client device 402 may submit LDAP operation requests to the LDAP server 410 via the LDAP client browser application 404. It should be appreciated that such requests may be routed through one or more data networks before reaching the LDAP server 410, as is generally known in the art. The LDAP operation request may request any of the standard LDAP operations including Bind, Unbind, Search, Add, Modify, ModifyDN, Delete, Compare, Abandon, or Extend. The LDAP server 410, after having performed the requested LDAP operation, may provide an appropriate response to the LDAP client 402.

As shown in FIG. 4, the LDAP server 410 includes an LDAP client interface 420 through which requests from LDAP clients are received and results of the LDAP operations are returned to the LDAP clients. The LDAP client interface 420 may store information regarding LDAP client device sessions for use in correlating LDAP requests with LDAP responses.

The LDAP client interface 420 provides a communication interface between the LDAP client 402 and the LDAP server application 422. In a preferred embodiment, the LDAP server 410 executes the IBM Tivoli Directory Server version 6.0 application available from International Business Machines, Inc. of Armonk, N.Y. More information about IBM Tivoli Directory Server may be obtained from the IBM Tivoli Directory Server Information Center at http://publib.boulder.ibm.com/infocenter/tivihelp/v2r1/index.jsp?topic=/com.ibm.IBMDS.doc_5.2.

The LDAP server application 422 provides a plug-in interface through which plug-in modules, such as pre-operation plug-in module 430 and post-operation plug-in module 440, may be dynamically loaded by the LDAP server application 422 and called in response to certain events, e.g., the initiation of an LDAP server operation or return of results of an LDAP server backend function call from LDAP server backend functions 450 to or from LDAP directory database 460.

The LDAP server plug-in modules, such as pre-operation plug-in module 430 and post-operation plug-in module 440, are shared libraries containing user defined functions. For example, the pre-operation plug-in module 430 contains functions for starting a timer and for placing a correlation token 480 in a parameter block (Pblock) 470 associated with the plug-in modules 430 and 440, possibly among other functions to be performed prior to performance of a LDAP server operation. The parameter block 470 is a data structure used by the LDAP server application 422 to communicate information to and from plug-in modules by passing the parameter block 470 in and out of the plug-in modules 430 and 440. In a similar manner, the post-operation plug-in module 440 contains functions for stopping the timer, possibly in addition to other functions that are to be performed after completion of an LDAP server operation.

The pre-operation and post-operation plug-in modules 430 and 440 may be registered with the LDAP server application 422 such that they may be dynamically loaded by the LDAP server application 422. Once the plug-in modules 430 and 440 are loaded by the LDAP server application 422, the LDAP server application 422 may call the functions in the plug-in modules 430 and 440 by using function pointers. Internally, the LDAP server application 422 has hooks, i.e. instructions that provide breakpoints for calling an outside routine or function, that allow a user to register custom functions to be called when specific events occur, such as prior to performing an LDAP server operation or immediately after performing an LDAP server operation.

Multiple LDAP server pre-operation and post-operation plug-in modules may be registered with and loaded by the LDAP server application 422. For example, a pair of plug-in modules, i.e. a pre-operation plug-in module and a post-operation plug-in module, may be registered for each of a plurality of LDAP server operations. In a preferred embodiment, a pair of plug-in modules is registered and loaded for each of the possible LDAP server operations that may be performed by the LDAP server application, e.g., bind, unbind, search, add, etc.

The LDAP server plug-in modules 430 and 440 are used by the LDAP server application 422 to automatically inject response time measurement code into the LDAP server application 422 before and after each LDAP server operation during real time operation of the LDAP server 410 in a runtime environment. For example, the LDAP server pre-operation plug-in module 430 injects code into the LDAP server application 422 for staring a timer and placing a correlation token 480 into the parameter block 470. The LDAP server post-operation plug-in module 440 injects code into the LDAP server application 422 to stop the timer.

The timer that is started and stopped by the pre-operation and post-operation plug-in modules 430 and 440 is used to measure the response time of the LDAP server 410. The timer may be provided in software, hardware, or a combination of software and hardware. The timer may be used to measure actual real time or processor time.

In one illustrative embodiment, the starting and stopping of the timer may be accomplished by taking a timestamp at the point in time when the timer is "started" and a timestamp at a point in time when the timer is "stopped." The pre-operation and post-operation plug-in modules 430 and 440 may store these timestamps, for example, in the LDAP server operation log data structure 485 in association with a session identifier and/or the correlation token 470 generated by the pre-operation plug-in module 430. The response time of the LDAP server 410 is the difference between the start and stop timestamps.

Of course other mechanisms other than timestamps may be used to provide the timer of the illustrative embodiments. For example, an actual timer mechanism that continues to increment elapsed time from a starting event to a stopping event may be utilized. A counter that counts a number of CPU cycles may be utilized as the timer of the illustrative embodiments. Any type of timer mechanism that may be used to measure an elapsed time of an LDAP operation is intended to be within the spirit and scope of the present invention. Moreover, multiple timers of the same or different types may be used with the pre-operation and post-operation plug-in modules of the illustrative embodiments.

The correlation token 480 may be generated and placed in the parameter block 470 associated with the plug-in modules 430 and 440 so that LDAP client and server operations may be correlated with one another in an end-to-end transaction. The parameter block 470 provides a mechanism for passing the correlation token 480 between plug-in modules 430 and 440 for the same LDAP server operation and passing the correlation token between the LDAP client 402 and LDAP server 410 and among LDAP client 402 calls within a single session.

The parameter block 470 contains data relevant to the LDAP server 410 operation and can be accessed, modified, and passed back to the LDAP server 410. The parameter block 470 may be modified through a plug-in module's pblock (parameter block) interface using slapi_pblock_set( ) and slapi_pblock_get( ), for example.

The same parameter block 470 that the LDAP server 410 receives back from a pre-operation plug-in module 430 may be passed to the post-operation plug-in module 440 for the same operation instance. Thus, as mentioned above, a correlation token 480 may be provided in the parameter block 470 during the execution of the pre-operation plug-in module 430. The correlation token 480 may then be automatically provided to the post-operation plug-in module 440 for the same operation instance. As a result, it can be guaranteed that the starting of the timer and stopping of the timer by the pre-operation and post-operation plug-in modules 430 and 440 are performed for the same LDAP operation instance.

Because the LDAP plug-in modules 430 and 440 are independent of each other with regard to their use with LDAP server operations, in order to have the LDAP plug-in modules 430 and 440 work in pairs, the correlation token 480 is used to correlate the pre-operation plug-in 430 functions with post-operation plug-in 440 functions. By using the correlation token 480, the start and stop timestamps may be stored in the same entry in the LDAP server operation log 485. Moreover, the LDAP server application 422 may pass the correlation token 480 back to the LDAP client device 402 with the response from the LDAP operation.

Thus, by using the pre-operation and post-operation plug-in modules 430 and 440 to start and stop a timer, and the correlation token 480 for correlating the start and stop of the timer, the total time of a LDAP server operation may be measured in real time within a runtime environment. In order to obtain end-to-end transaction response time measurements, however, the correlation of this LDAP server operation response time with response times of other components of the system, e.g., LDAP client operations, is required. The correlation token 480 used to correlate the pre-operation and post-operation plug-in modules 430 and 440 may also be used to correlate the response time of the LDAP server operation with operations of other components of the system, such as the LDAP client 402 operations.

As mentioned above, when an LDAP client 402 initializes itself to the LDAP server 410, such as via a ldap_init( ) method call, a session handle, i.e. a pointer to an opaque session data structure, which may be stored, for example, in the client operation log data structure 408, that may be passed to subsequent calls that pertain to the session, is returned. The ldap_get_option( ) and ldap_set_option( ) application program interfaces (APIs) may be used to access and set a variety of session-wide parameters in this opaque data structure. Thus, the session handle and these APIs may be used to pass the correlation token 480 from the LDAP server 410 operations to LDAP client 402 operations, from LDAP client 402 operations to LDAP server 410 operations, and among LDAP client 402 operations within the same session.

The LDAP client 402 may be provided with an LDAP client response time measurement module 406 for each of the LDAP client's operations, similar to the plug-in modules 430 and 440. The response times measured by the LDAP client response measurement module 406 may be correlated with the response times measured by the LDAP server 410 through use of the correlation token 480, the session handle, and the opaque data structure. A log of the various response times may be maintained, for example, in the client operation log data structure 408, and entries may be correlated by way of the correlation token 480, which may itself be recorded in entries of the client operation log data structure 408. The client operation log data structure 408 may be part of or may include the opaque data structure referenced by the session handle, for example.

Multiple log data structures, such as client operation log data structure 408 and LDAP server operation log 485, may be maintained within the LDAP client 402 and the LDAP server 410. Entries within the multiple log data structures 408 and 485 may be correlated using the session handle and/or the correlation token 480. In this way, response time measurement information for an entire end-to-end transaction, i.e. including both LDAP client response time measurements and LDAP server response time measurements, may be obtained.

The correlation of entries in the various logs, e.g., client operation log data structure 408 and LDAP server operation log 485, may be performed, for example, in an administrator workstation 490 in order to obtain information about end-to-end LDAP transactions. For example, the administrator workstation 490 may be provided with a transaction response time correlation engine 492 which correlates entries from the logs 408 and 485 based on session handle and/or correlation token 480. The correlated response time information may then be used as input to a response time information output generation engine 494 that generates an informational output to output device 496. Such an informational output may be a graphical user interface through which a user is able to obtain information about the end-to-end LDAP transaction at various levels of detail, for example. Thus, the user is able to obtain detailed information about the performance of the LDAP server 410 and the response time experienced by the user of the LDAP client device 402.

FIG. 5 is an exemplary diagram illustrating a graphical user interface display of response time that may be generated using the response time measurement mechanisms of an illustrative embodiment. In the example shown in FIG. 5, an LDAP client, such as LDAP client 402, invokes several LDAP server 410 operations during a session, e.g., Add, Modify, Bind, and Search. The hostname of the LDAP server is "test19.cn.ibm.com." The LDAP:OPERATION node 510 is the LDAP client operation.

The other nodes 520-550 are LDAP server side invocations. Each node 510-550 is marked with a name of the operation, e.g., "LDAP:OPERATION:BIND", and the response time in seconds.

The particular graphical user interface shown in FIG. 5 illustrates an aggregate view of several LDAP sessions. The first response time value is the normal response time and the second response time value, after the "/", is the slowest instance response time. The response time is cumulative as the nodal tree is traversed upwards. Thus, the LDAP client operation node's response times will include the response times of the LDAP server operations in addition to response times of the LDAP client operations.

Each node is selectable to obtain a more detailed graphical description of the response time measurements. For example, the LDAP client operation node 510 may be selected in order to "drill down" to a more detailed level to obtain information regarding the response times that make up the response time displayed as part of the LDAP client operation node 510. Thus, a detailed graphical topology is generated based on the response time measurements obtained from the response time measurement module of the LDAP client and the plug-in modules of the LDAP server. With information provided in this topology, user may quickly identify performance problems in the LDAP server.

By monitoring LDAP directory services using the mechanisms of the illustrative embodiments, as described above, one can minimize the loss caused by unavailability and degraded performance by detecting such conditions early. Moreover, as an integral part of Web enterprise solutions, the LDAP server 410 may be monitored in the context of the entire business transaction in real time and in a runtime environment, thereby providing end-to-end transaction response time tracking.

FIGS. 6 and 7 are flowcharts outlining exemplary operations of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for measuring a response time of an LDAP server ADD operation in accordance with one illustrative embodiment. It should be appreciated that while FIG. 6 is used to illustrate the operation of plug-in modules for a LDAP server ADD operation, a similar process may be used with other LDAP server operations, including Bind, Search, Compare, and the like. The LDAP server ADD operation is only used as an example and is not intended to state or imply any limitation with regard to the types of LDAP server operations that the plug-in modules of the illustrative embodiments may be used with. In fact, in a preferred embodiment, a pair of plug-in modules is provided for each LDAP server operation so that all LDAP server operations may be monitored for response times.

As shown in FIG. 6, the operation starts with the LDAP server receiving a request to perform an LDAP add operation (step 610). The request preferably includes the new distinguished name (DN) and the entry to be added. The LDAP server sets the parameter block so that it contains the new DN and entry (step 620). The LDAP server then calls any functions of pre-operation plug-in modules registered for an LDAP add operation (step 630). The LDAP server passes the parameter block to these functions of the registered pre-operation plug-in module (step 640).

The pre-operation plug-in module's functions start a timer and mark the beginning of the add operation transaction by taking an initial timestamp (step 650). In addition, the pre-operation plug-in module's functions place the correlation token in the parameter block to be passed to the post-operation plug-in module's functions (step 660).

The LDAP server then performs the LDAP server add operation using the DN and entry in the parameter block (step 670). The performance of an LDAP server add operation is generally known in the art and thus, a more detailed explanation is not provided herein.

After performing the LDAP server add operation, the LDAP server calls functions of any post-operation plug-in modules registered for the LDAP server add operation, passing them the parameter block that now includes the correlation token (step 680). The post-operation plug-in module's functions retrieve the correlation token from the parameter block and stop the timer that was started by the pre-operation plug-in module, taking a timestamp associated with the stop time in the process (step 690). A response message may then be sent to the LDAP client indicating the completion of the LDAP server add operation and providing the correlation token for use in correlating LDAP client operations with the LDAP server add operation (step 695). The operation then terminates.

FIG. 7 is a flowchart outlining an exemplary operation for obtaining an end-to-end transaction response time information utilizing the mechanisms of one illustrative embodiment. As shown in FIG. 7, the operation starts with a transaction response time correlation engine, such as provided on an administrator workstation or the like, retrieving LDAP client operation and LDAP server operation log entries (step 710). The transaction response time correlation engine identifies a first subset of entries for a particular session handle in the logs (step 720). The transaction response time correlation engine then identifies a second subset of entries within the first subset of entries for a particular correlation token (step 730). The transaction response time correlation engine determines whether there are additional entries for the session handle that need to be correlated (step 740). If so, the operation returns to step 730 and identifies additional subsets of entries based on common correlation tokens.

Otherwise, if there are no additional entries to be correlated for the session handle, the transaction response time correlation engine determines whether there are additional entries associated with different session handles (step 750). If so, the operation returns to step 720 and additional subsets of entries from the logs are identified based on session handles. Otherwise, if there are no additional entries having different session handles, then the sets of entries are provided to a response time information output generation engine (step 760). The response time information output generation engine generates a graphical user interface for displaying response time measurements for LDAP client and LDAP server operations (step 770) and outputs the graphical user interface via an output device (step 780). The operation then terminates.

Thus, the illustrative embodiments provide a mechanism for performing real time measurements of response times for LDAP server operations in a runtime environment. Moreover, the illustrative embodiments provide a mechanism for correlating LDAP server operation response time measurements with LDAP client operation response time measurements so that an end-to-end transaction response time measurement may be obtained. The illustrative embodiments make use of pairs of plug-in modules that are correlated with each other via a correlation token and a parameter block that is used as a means for passing the correlation token between plug-in modules. Moreover, the illustrative embodiments use the correlation token as a mechanism for correlating response time measurements made by the plug-in modules with response time measurements made by LDAP client response time measurement modules. In this way, actual response time measurements may be obtained for identifying problems in the availability and responsiveness of an LDAP server.

It should be appreciated that while the description of the illustrative embodiments provided above makes reference to a single timer for each LDAP operation, as mentioned above, the illustrative embodiments are not limited to such. Rather, for each individual LDAP operation a plurality of timers may be established and initiated and stopped in accordance with pre-operation plug-ins and post-operation plug-ins. Moreover, whether or not a single timer or multiple timers are utilized, these timers may be provided in any suitable manner including an actual timer that continues to track elapsed time from a start of the timer to an end of the timer, taking timestamps associated with an event that starts the timer and an event that stops the timer (as well as any other intermediate timer timestamp values that may be desirable to record), a counter that counts CPU cycles or other periodic events, or other timing mechanisms that will be readily apparent to those of ordinary skill in the art in view of the present description. Any number of timers and/or types of timer mechanisms may be used without departing from the spirit and scope of the present invention.

The illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As described previously above, a data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a Lightweight Directory Access Protocol (LDAP) server, for measuring a response time of the LDAP server with regard to an LDAP transaction, comprising:
loading, in the LDAP server, a pre-operation plug-in module having a first function for starting a timer;
loading, in the LDAP server, a post-operation plug-in module having a second function for stopping the timer;
receiving, in the LDAP server, a request for an LDAP operation;
calling, by the LDAP server, the first function in the pre-operation plug-in module to start the timer in response to receiving the request for the LDAP operation;
storing, by the LDAP server, a correlation token generated by the pre-operation plug-in module and a started timestamp taken by the pre-operation plug-in module in an operation log upon starting the timer;
passing, by the LDAP server, the correlation token to the post-operation plug-in module;
performing, by the LDAP server, the requested LDAP operation after calling the first function;
calling, by the LDAP server, the second function in the post-operation plug-in module to stop the timer in response to completion of the LDAP operation;
storing, by the LDAP server, the correlation token and a stopped timestamp taken by the post-operation plug-in module in the operation log upon stopping the timer; and
measuring, by the LDAP server, a response time for the LDAP operation based on a difference between the started timestamp and the stopped timestamp using the correlation token to identify related timestamps in a plurality of timestamps stored in the operation log, wherein the pre-operation plug-in module and post-operation plug-in module constitute a pair of plug-in modules and wherein a separate pair of plug-in modules is loaded for individual ones of client accessible LDAP operations in a plurality of LDAP operations received from an LDAP client.

2. The method of claim 1, wherein the pre-operation plug-in module and post-operation plug-in module are shared libraries containing user defined functions.

3. The method of claim 1, wherein the pre-operation plug-in module and post-operation plug-in module are independent of each other, and wherein a correlation mechanism correlates the pre-operation plug-in module with the post-operation plug-in module.

4. The method of claim 1, further comprising:
correlating the pre-operation plug-in module with the post-operation plug-in module by passing the correlation token between the pre-operation plug-in module and post-operation plug-in module using a first parameter block associated with the pre-operation plug-in module and a second parameter block associated with the post-operation plug-in module.

5. The method of claim 4, further comprising:
passing the correlation token to the LDAP client that sent the request for the LDAP operation; and
correlating LDAP client operations with the LDAP operation using the correlation token.

6. The method of claim 5, wherein passing the correlation token to the LDAP client comprises using a session handle and data structure associated with the session handle to pass the correlation token.

7. The method of claim 5, wherein code executing on the LDAP client includes response time measurement code, and wherein the LDAP client maintains a log of response time information for LDAP client operations based on the response time measurement code and the correlation token.

8. The method of claim 7, further comprising:
correlating response time information in the log of response time information for a particular session with the response time for the LDAP operation to generate LDAP transaction response time information; and
providing an output indicative of the LDAP transaction response time information.

9. The method of claim 8, wherein correlating response time information in the log of response time information with the response time for the LDAP operation comprises:
retrieving log entries from the log of response time information and a log of LDAP operation response times;
identifying a first subset of entries for a particular session handle in the logs;
identifying a second subset of entries within the first subset of entries for a particular correlation token; and
using the second subset of entries to generate the LDAP transaction response time information.

10. The method of claim 8, wherein the output comprises a graphical user interface having one or more user selectable representations of portions of the LDAP transaction.

11. The method of claim 10, wherein greater detailed response time information is provided via the graphical user interface in response to a user selecting a user selectable representation of a portion of the LDAP transaction.

12. A computer program product comprising a non-transitory computer readable storage medium having a computer readable program stored thereon, wherein the computer readable program, when executed on a computing device, causes the computing device to:
load, in a Lightweight Directory Access Protocol (LDAP) server, a pre-operation plug-in module having a first function for starting a timer;
load, in the LDAP server, a post-operation plug-in module having a second function for stopping the timer;
receive, in the LDAP server, a request for a LDAP operation;
call, by the LDAP server, the first function in the pre-operation plug-in module to start the timer in response to receiving the request for the LDAP operation;
store, by the LDAP server, a correlation token generated by the pre-operation plug-in module and a started timestamp taken by the pre-operation plug-in module in an operation log upon starting the timer;
pass, by the LDAP server, the correlation token to the post-operation plug-in module;
perform, by the LDAP server, the requested LDAP operation after calling the first function;
call, by the LDAP server, the second function in the post-operation plug-in module to stop the timer in response to completion of the LDAP operation;
store, by the LDAP server, the correlation token and a stopped timestamp taken by the post-operation plug-in module in the operation log upon stopping the timer; and
measure a response time for the LDAP operation based on a difference between the started timestamp and the stopped timestamp using the correlation token to identify related timestamps in a plurality of timestamps stored in the operation log, wherein the pre-operation plug-in module and post-operation plug-in module constitute a pair of plug-in modules and wherein a separate pair of plug-in modules is loaded for individual ones of client accessible LDAP operations in a plurality of LDAP operations received from an LDAP client.

13. The computer program product of claim 12, wherein the pre-operation plug-in module and post-operation plug-in module are shared libraries containing user defined functions.

14. The computer program product of claim 12, wherein the pre-operation plug-in module and post-operation plug-in module are independent of each other, and wherein a correlation mechanism correlates the pre-operation plug-in module with the post-operation plug-in module.

15. The computer program product of claim 12, wherein the computer readable program further causes the computing device to:
correlate the pre-operation plug-in module with the post-operation plug-in module by passing the correlation token between the pre-operation plug-in module and post-operation plug-in module using a first parameter block associated with the pre-operation plug-in module and a second parameter block associated with the post-operation plug-in module.

16. The computer program product of claim 15, wherein the computer readable program further causes the computing device to:
pass the correlation token to the LDAP client that sent the request for the LDAP operation; and
correlate LDAP client operations with the LDAP operation using the correlation token.

17. The computer program product of claim 16, wherein the computer readable program causes the computing device to pass the correlation token to the LDAP client by using a session handle and data structure associated with the session handle to pass the correlation token.

18. The computer program product of claim 16, wherein code executing on the LDAP client includes response time measurement code, and wherein the LDAP client maintains a log of response time information for LDAP client operations based on the response time measurement code and the correlation token.

19. The computer program product of claim 18, wherein the computer readable program further causes the computing device to:
correlate response time information in the log of response time information for a particular session with the response time for the LDAP operation to generate LDAP transaction response time information; and
provide an output indicative of the LDAP transaction response time information.

20. The computer program product of claim 19, wherein the computer readable program causes the computing device to correlate response time information in the log of response time information with the response time for the LDAP operation by:
retrieving log entries from the log of response time information and a log of LDAP operation response times;
identifying a first subset of entries for a particular session handle in the logs;
identifying a second subset of entries within the first subset of entries for a particular correlation token; and
using the second subset of entries to generate the LDAP transaction response time information.

21. The computer program product of claim 19, wherein the output comprises a graphical user interface having one or more user selectable representations of portions of the LDAP transaction.

22. The computer program product of claim 21, wherein greater detailed response time information is provided via the graphical user interface in response to a user selecting a user selectable representation of a portion of the LDAP transaction.

23. An apparatus for measuring a response time of a Lightweight Directory Access Protocol (LDAP) server with regard to an LDAP transaction, comprising:
a processor; and
a memory coupled to the processor, wherein the memory contains instructions which, when executed by the processor, cause the processor to:
load, in the LDAP server, a pre-operation plug-in module having a first function for starting a timer;
load, in the LDAP server, a post-operation plug-in module having a second function for stopping the timer;
receive, in the LDAP server, a request for an LDAP operation;
call, by the LDAP server, the first function in the pre-operation plug-in module to start the timer in response to receiving the request for the LDAP operation;
store, by the LDAP server, a correlation token generated by the pre-operation plug-in module and a started timestamp taken by the pre-operation plug-in module in an operation log upon starting the timer;
pass, by the LDAP server, the correlation token to the post-operation plug-in module;
perform, by the LDAP server, the requested LDAP operation after calling the first function;
call, by the LDAP server, the second function in the post-operation plug-in module to stop the timer in response to completion of the LDAP operation;
store, by the LDAP server, the correlation token and a stopped timestamp taken by the post-operation plug-in module in the operation log upon stopping the timer; and
measure a response time for the LDAP operation based on a difference between the started timestamp and the stopped timestamp using the correlation token to identify related timestamps in a plurality of timestamps stored in the operation log, wherein the pre-operation plug-in module and post-operation plug-in module constitute a pair of plug-in modules and wherein a separate pair of plug-in modules is loaded for individual ones of client accessible LDAP operations in a plurality of LDAP operations received from an LDAP client.

24. The apparatus of claim 23, wherein the pre-operation plug-in module and post-operation plug-in module are shared libraries containing user defined functions.

25. The apparatus of claim 23, wherein the pre-operation plug-in module and post-operation plug-in module constitute a pair of plug-in modules, and wherein a separate pair of plug-in modules is loaded for each client accessible LDAP operation.

26. The apparatus of claim 23, wherein the instructions further cause the processor to:
correlate the pre-operation plug-in module with the post-operation plug-in module by passing the correlation token between the pre-operation plug-in module and post-operation plug-in module using a first parameter block associated with the pre-operation plug-in module and a second parameter block associated with the post-operation plug-in module.

27. The apparatus of claim 26, wherein the instructions further cause the processor to:
pass the correlation token to the LDAP client that sent the request for the LDAP operation; and correlate LDAP client operations with the LDAP operation using the correlation token.

28. The apparatus of claim 27, wherein the instructions cause the processor to pass the correlation token to the LDAP client by using a session handle and data structure associated with the session handle to pass the correlation token.

29. The apparatus of claim 27, wherein code executing on the LDAP client includes response time measurement code, and wherein the LDAP client maintains a log of response time information for LDAP client operations based on the response time measurement code and the correlation token.

30. The apparatus of claim 29, wherein the instructions further cause the processor to:
   correlate response time information in the log of response time information for a particular session with the response time for the LDAP operation to generate LDAP transaction response time information; and
   provide an output indicative of the LDAP transaction response time information.

31. The apparatus of claim 30, wherein the instructions cause the processor to correlate response time information in the log of response time information with the response time for the LDAP operation by:
   retrieving log entries from the log of response time information and a log of LDAP operation response times;
   identifying a first subset of entries for a particular session handle in the logs;
   identifying a second subset of entries within the first subset of entries for a particular correlation token; and
   using the second subset of entries to generate the LDAP transaction response time information.

32. The apparatus of claim 30, wherein the output comprises a graphical user interface having one or more user selectable representations of portions of the LDAP transaction.

* * * * *